No. 743,248. PATENTED NOV. 3, 1903.
H. S. COMBS.
WIRE NETTING MACHINE.
APPLICATION FILED MAY 1, 1903.
NO MODEL. 10 SHEETS—SHEET 2.

WITNESSES:
Louis Dieterich
John T. Schrott

INVENTOR
H. S. Combs.
BY
Fred G. Dieterich & Co
Attorneys.

No. 743,248. PATENTED NOV. 3, 1903.
H. S. COMBS.
WIRE NETTING MACHINE.
APPLICATION FILED MAY 1, 1903.
NO MODEL. 10 SHEETS—SHEET 3.

WITNESSES:
Louis Dieterich
John T. Schrott

INVENTOR
H. S. Combs
By Fred G. Dieterich
Attorneys

No. 743,248. PATENTED NOV. 3, 1903.
H. S. COMBS.
WIRE NETTING MACHINE.
APPLICATION FILED MAY 1, 1903.
NO MODEL. 10 SHEETS—SHEET 4.

WITNESSES:
Louis Dietrich
John T. Schrott

INVENTOR
H. S. Combs.
BY
Fred G. Dieterich & Co.
Attorneys.

No. 743,248. PATENTED NOV. 3, 1903.
H. S. COMBS.
WIRE NETTING MACHINE.
APPLICATION FILED MAY 1, 1903.
NO MODEL. 10 SHEETS—SHEET 6.

WITNESSES:
Louis Dieterich
John T. Schrott

INVENTOR
H. S. Combs.
BY
Fred G. Dieterich & Co.
Attorneys.

No. 743,248. PATENTED NOV. 3, 1903.
H. S. COMBS.
WIRE NETTING MACHINE.
APPLICATION FILED MAY 1, 1903.
NO MODEL. 10 SHEETS—SHEET 7.

WITNESSES:
Louis Dieterich
John T. Schrott

INVENTOR
H. S. Combs

BY
Fred G. Dieterich & Co.
Attorneys

No. 743,248. Patented November 3, 1903.

UNITED STATES PATENT OFFICE.

HIRAM S. COMBS, OF SHARON, PENNSYLVANIA, ASSIGNOR TO WINSOR CHASE, OF EVANSTON, ILLINOIS.

WIRE-NETTING MACHINE.

SPECIFICATION forming part of Letters Patent No. 743,248, dated November 3, 1903.

Application filed May 1, 1903. Serial No. 165,167. (No model.)

*To all whom it may concern:*

Be it known that I, HIRAM S. COMBS, residing at Sharon, in the county of Mercer and State of Pennsylvania, have invented a new and Improved Wire-Netting Machine, of which the following is a specification.

My present invention seeks to provide certain new and useful improvements in that class of wire-netting machines in which is included a series of reversibly-rotatable twisters for interlacing or twisting the wire strands together, a means for reciprocating the twisters whereby to form a netting composed of a series of parallel wires twisted together at intervals to produce uniform meshes, and in which the twisting mechanisms operate under alternate right and left hand movement, and in which suitable devices are provided for automatically taking up the wire from the bobbins and spools and for automatically rolling up the finished product.

In the following description I shall in a general way specify the complete construction of my machine and also illustrate the same in its complete shape in the drawings to more clearly disclose my machine in its entire or practical shape, whereby to render the complete operation and the advantages thereof the more readily understood.

It is deemed proper to here state that the main purpose of my invention is to provide a machine in which a coöperative arrangement of parts is provided which act automatically to produce the style and kind of fabric desired in an economical, perfect, expeditious, and substantial manner.

In wire-netting machines of the character above noted, and in which are included bobbins having upper and lower divided gear devices coöperatively joined therewith, I have found from practical experience that in machines of this kind heretofore used the reciprocal or lateral thrust of the upper head and the members thereof provided for carrying the wires to be twisted do not perform the functions for which they have been provided in an entirely satisfactory manner, for the reason that when the wires become entangled or when heavier wire is used the separate halves of the gear-heads are often forced apart, forming an eccentric instead of a round bearing, thereby forcing the bobbin-bearing slides against the frame, making them immovable, and thereby bending the rack-bar or breaking some of the driving-gearing and sometimes bending the connecting-rods, causing much damage to the machine. Also when the twist of the wires is made close to the head of the upper gear-heads and the bobbin-bearing slides are reciprocated the wires are drawn sharply over the edge of the opening in the gear-heads, making an irregular-shaped mesh and wearing away the edges of the opening in the gear-head, thereby requiring frequent bushing of the opening in the gear-heads. This objectionable feature I seek to overcome, and especially to provide a new and improved construction of twister-gear mechanism, the upper or head member having separating arms or stems so arranged that the action of guiding the pairs of strands as they pass out of the upper gear-head to be twisted will be positive and uniformly conveyed or moved to the proper points at which it is desired to twist the said strands together.

My present invention also comprehends an improved two-part twister-gear having the opposing members especially designed whereby they can be economically manufactured, readily assembled for an operative combination, which possess the desired quality of strength and durability, and which especially have such relation that in the shifting of the head-sections to alternately interengage with each other the said action will be positive and the two parts of the heads caused to accurately join at the proper predetermined times and be held firmly together, so that they cannot be forced apart in case of a tangle of the strands or when heavy wire is used.

Another feature of my invention lies in the special construction and coöperative arrangement of the bobbins and the twister heads or gears whereby any one of the bobbins can be almost instantly removed and a filled bobbin replaced without requiring a special adjustment of the twister-heads or the bobbin-carrying frame.

Furthermore, my invention embodies improvements in the means for actuating the reciprocal rack mechanism and the bobbin-carrying slides for imparting the necessary rotary or twist motion to the body-gears, and includes a peculiar arrangement of eccentric or wrist-pin connections between the pitmen that join the upper and lower slides or rack-frames with the crank or cam-disk actuating means, whereby the rack-actuating and bobbin-shifting devices can be readily and conveniently adjusted to regulate the reciprocal thrust of the bobbin-carriers relatively to the timed action of the bobbin-gears.

Again, my present invention seeks to provide an improved arrangement of evener and latch devices for temporarily locking the reciprocal bobbin-carrying frames from movement while the twister heads or gears are being rotated; and in its more subordinate features my invention consists in certain details of construction and peculiar combination of parts, all of which will hereinafter be fully described, and illustrated in the accompanying drawings, and specifically pointed out in the appended claims.

Before describing my present invention in detail I deem it proper to state that the said invention embodies generically the features shown in Patent No. 310,254, granted to me January 6, 1885, in which are disclosed a suitable supporting-frame, a series of bobbins having upper and lower twister heads or gears, reciprocal upper and lower frames in which the upper and lower bobbin-gears are mounted, rack members for imparting reverse rotary motion to the bobbin-gears, and means for reciprocating the upper and lower bobbin-carrying frames and evener, and latch mechanism for locking the shifter or reciprocal frames during the operation of imparting rotary motion in reverse directions to the bobbin-gears, means also being shown in the said patent for feeding the warp-wires to the machine to coöperate with the woof-wires mounted upon the bobbins. My present invention in its more especial features differentiates from the mechanism disclosed in my former patent aforesaid in the peculiar construction of the bobbin-supporting reciprocal frames, particularly the construction of the upper and lower bobbin-gears, the dummy twister-gears, and the evener devices. Numerous other details of construction are also embodied in my present invention which hereinafter will fully appear.

In the accompanying drawings, Fig. 5 is a diagrammatic side elevation of a portion of the drive-gear mechanism hereinafter specifically referred to. Fig. 16 is a side view, and Fig. 17 is a vertical section, of the top dummy twister-gear hereinafter referred to. Fig. 23 is a diagrammatic plan view of the inner end of one of the connecting-rods, the means for joining it with its coacting shifter-bar, and the eccentric or bushing means for adjusting the throw of the crank-disk. Fig. $23^a$ is a cross-section on the line $a\,a$ of Fig. 23. Fig. 24 is a detail plan view, and Fig. 25 is a vertical section, of the hinged connection of one of the latch-arms hereinafter described.

In the practical construction of my invention the same includes a suitable supporting-frame, the general arrangement of which is clearly shown in Figs. 1 to 4, and comprises end portions 1 and 2, upon which are mounted the twister and the wire-net conveying and take-up mechanism, and an end portion 3, on which the shifter-bar and the take-up and conveyer actuating means are mounted in the manner presently explained in detail.

In my present construction of wire-netting machine the warp-wires $w$ are fed to the twisting means from spools (not shown) arranged substantially the same as is shown in my other patent referred to, from whence the said wires pass up under a horizontal guide-roller 4 up through the lower and upper twister-gears to interengage with the woof-wires $w'$, as best shown in Figs. 7 to 14 and in the manner hereinafter explained.

Figure 21:
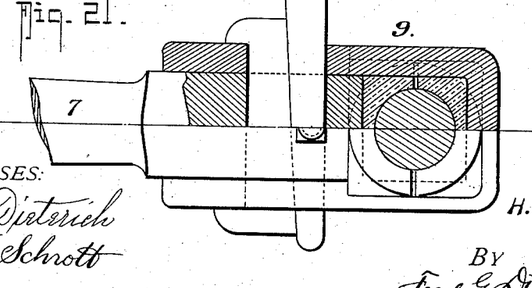
Fig. 21 is a horizontal section of one of the wrist-pin connections that join the connecting-rods with the crank-disk.
Figure 22:
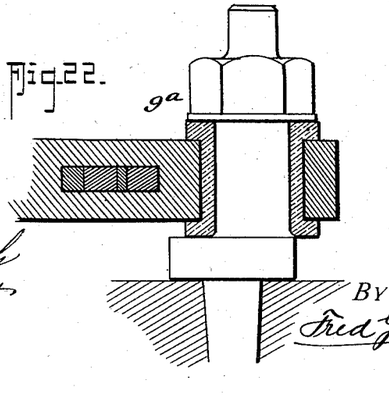
Fig. 22 is a vertical section of the same.
Figures 23, 23A, 24, 25:
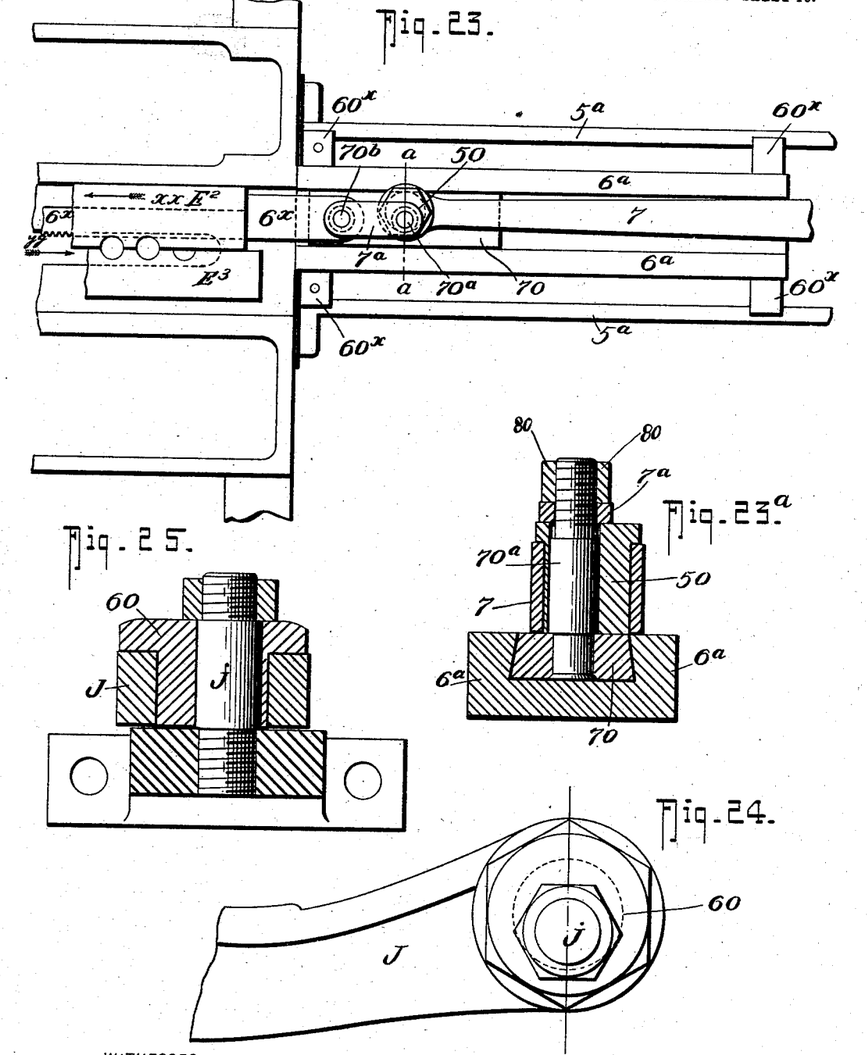

The drive-shaft $b$ is mounted at one end in a bearing $b'$ on the frame-section 2 and in a bearing $b^2$ in a standard $3^a$ adjacent the end frame 3 and which is bolted to the upper and lower longitudinal frame-beams 5 $5^a$, to which the cross-head guides 6 $6^a$ are firmly bolted, as best shown in Fig. 23, in which 70 designates a cross-head which is reciprocably slidable in the guide $6^a$, which has lateral extensions $60^x$ at the ends bolted to the frame portions $5^a$ $5^a$. The cross-head 70 in practice is a piece of steel having beveled sides (see Fig. $23^a$) to engage the undercut sides of the slide-way in the guide $6^a$, and it also has rigidly connected therewith two studs $70^b$ $70^a$, projected upwardly therefrom, and upon the centrally-disposed stud $70^a$ is mounted an eccentric bushing, the combination of which is clearly shown in Fig. $23^a$. The bushing 50 on the stud $70^a$ passes through the opening in the connecting-rod 7, and the stud $70^a$ connects with the link member $7^a$, the inner end of which joins with the stud $70^b$, that passes through the adjacent end of the rack-bar $6^x$. Two nuts 80 80 are screwed onto the upper ends of the studs to firmly force the link member $7^a$ down upon the eccentric bushing to hold the same to its adjusted positions. By reason of the peculiar manner in which the connecting-rod and the rack-bar are joined it is apparent that by a proper turning of the wrist-pin 9 (see Figs. 1, 2, and 21) on the crank-disk 8 the throw of the crank can be very accurately adjusted to the degree necessary to move the rack-bar $6^x$ to the required distance to revolve the gear-heads $F^x$ to shift the slides $E^2$ $E^3$, as will hereinafter be explained, and by turning the eccentric bushing 50, mounted in the cross-head 70, the said cross-head can be adjusted longitudinally to accurately set the slides $E^2$ $E^3$ with respect to the shoulders $d^x$ $d^y$ on the opposite ends of the rack-bar, so that when the said shoulders $d^x$ and $d^y$ engage with the ends of the slide $E^2$ said slide will be moved to the desired distance to cause the slides $E^2$ $E^3$ (which are linked together, as hereinafter explained) to register and form complete round bearings for the gear-heads $F^x$ to turn in. It is understood the slides E E' are operated in precisely the same manner.

Figure 1:
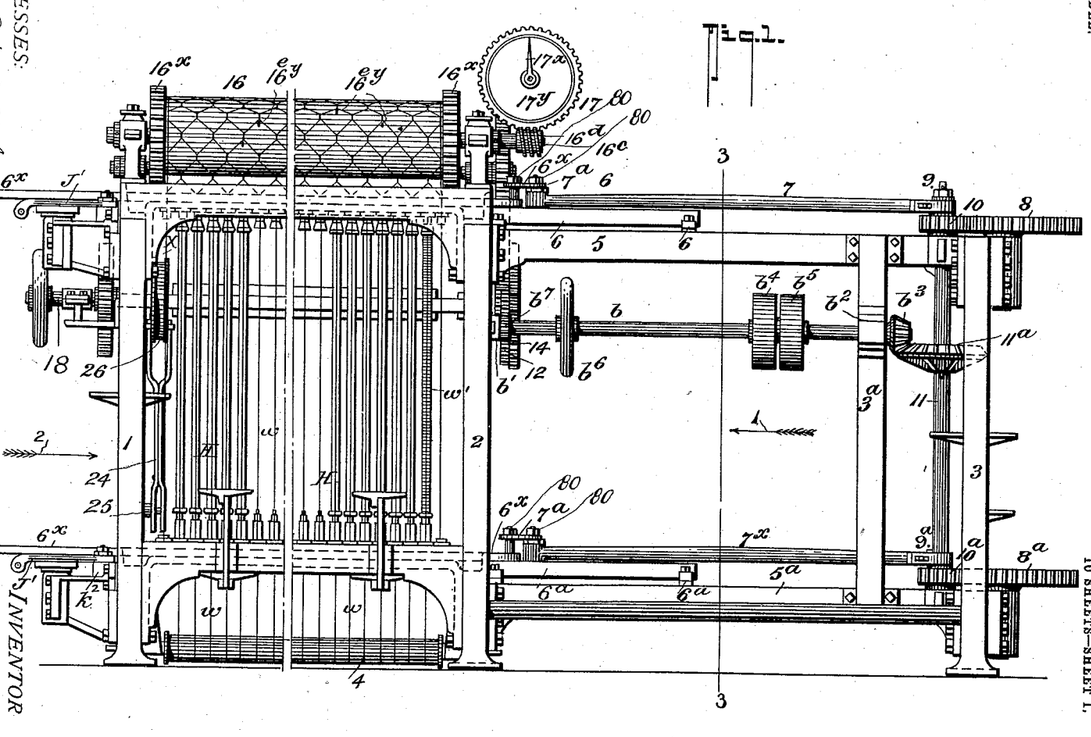
Figure 1 is a front elevation of my improved wire-netting machine.
Figure 2:
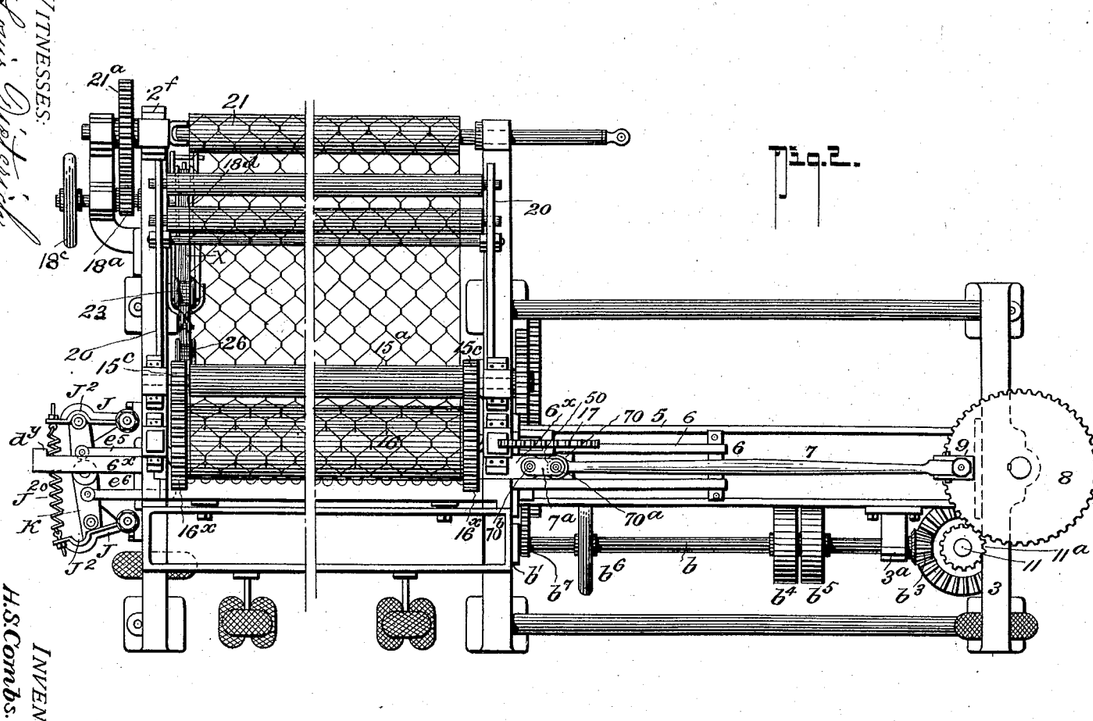
Fig. 2 is a top plan view thereof.
Figure 3:
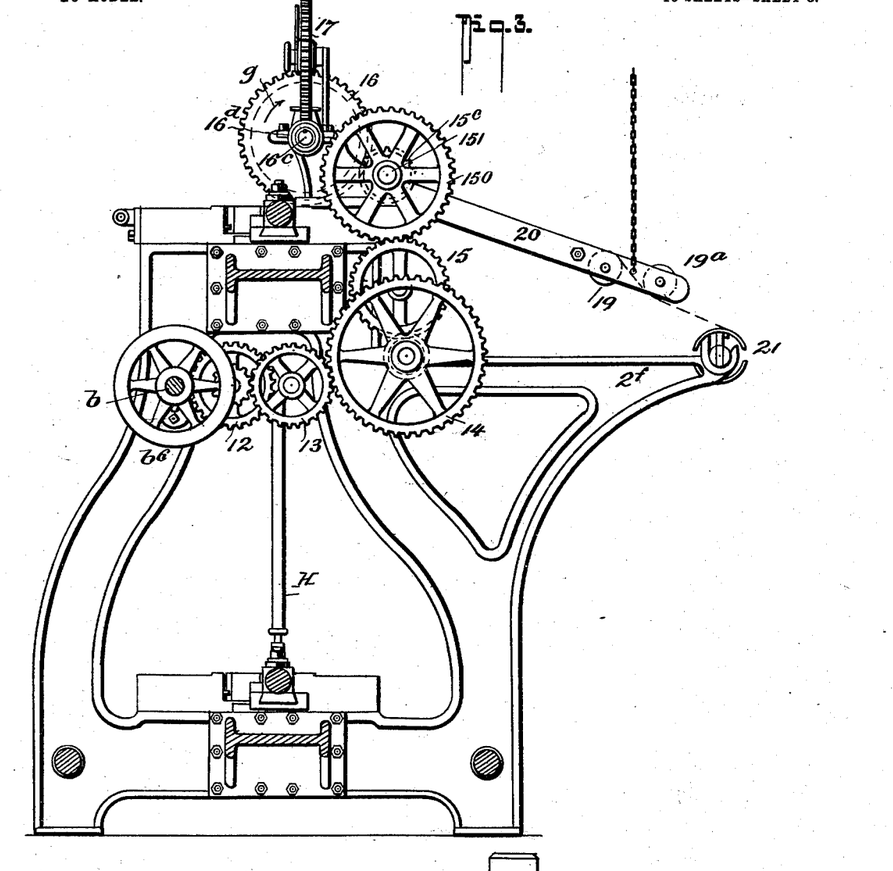
Fig. 3 is a cross-section of the same on the line 3 3 of Fig. 1 looking in the direction of the arrow 1.
Figure 4:
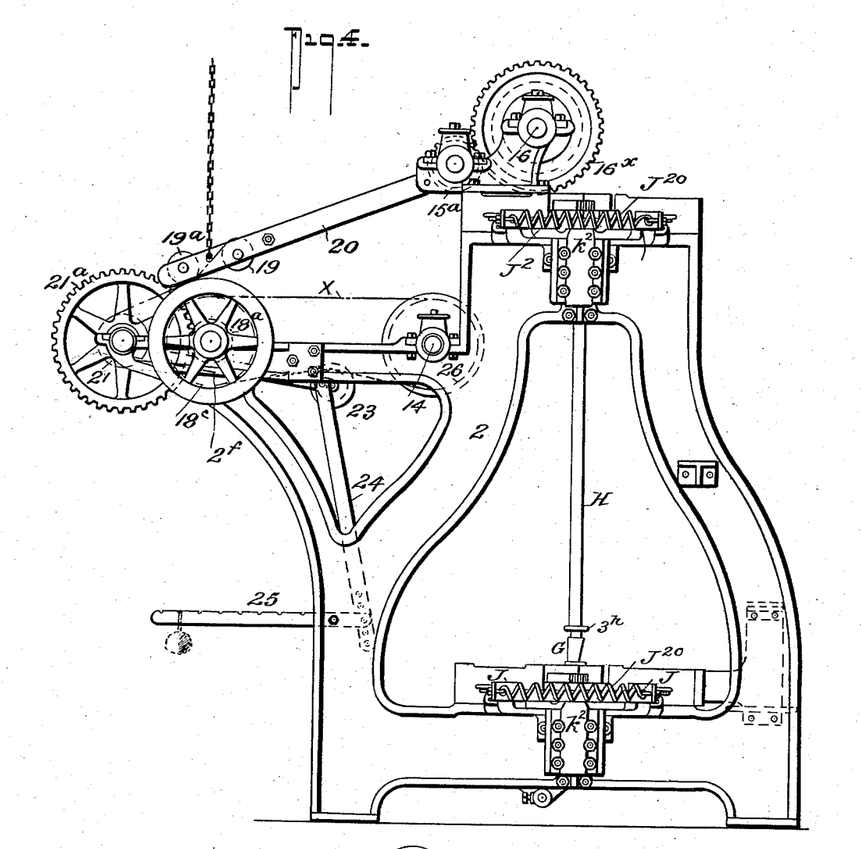
Fig. 4 is an end elevation looking in the direction of the arrow 2 of Fig. 1.
Figure 5:
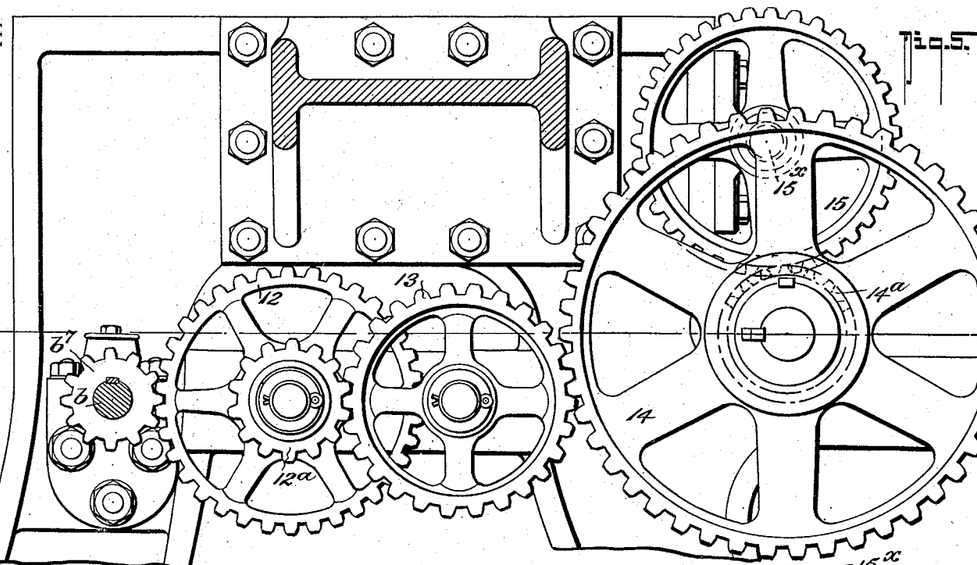
Figure 6:
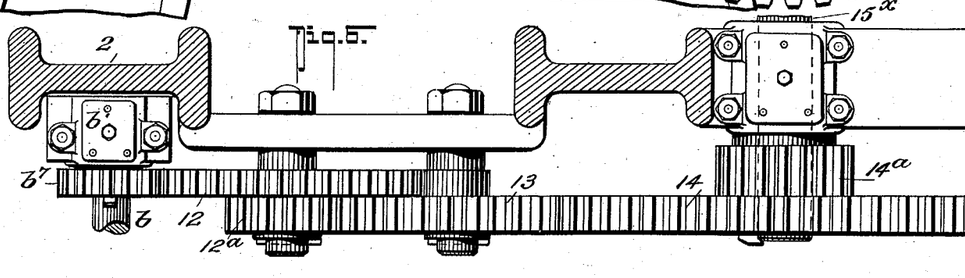
Fig. 6 is a plan view of the gear mechanism shown in Fig. 5.

The cogged disks 8 $8^a$ mesh with cog-pinions 10 $10^a$, mounted on the vertically-disposed drive-shaft 11, (see Fig. 1,) which is provided with a beveled pinion $11^a$, held in mesh with the drive-pinion $b^3$ on the main drive-shaft $b$, which has the usual loose and fast belt-pulleys $b^4$ $b^5$, and in the present case said shaft is also provided with an adjusting hand-wheel $b^6$, and at its inner end it has a pinion $b^7$, that meshes with a gear 12, provided with a hub portion $12^a$, held in mesh with an idler-gear 13, that engages with a larger gear 14, provided at one end with a flanged pulley 26 and at the other end with a hub-pinion $14^a$, which engages a gear 15, (see Figs. 5 and 6,) mounted on a stud $15^x$ on a bracket portion bolted to the frame, and the gear 15 meshes with a gear 150 on a shaft 151, that carries a combined guide and netting-presser roller $15^a$, which is disposed parallel with and at the rear of the net-receiving and backward-conveying spur-equipped drum 16, (see Fig. 2,) and the said shaft 151 also carries at each end a gear $15^c$, which meshes with the gears $16^x$ $16^x$ of the drum 16, and thereby imparts a proper rotation (see arrow $g$, Fig. 3) to the drum 16. The shaft $16^c$ of the drum 16 carries a worm-hub $16^d$ at its outer end for engaging with an arbitrarily-toothed wheel 17, which actuates the pointer $17^x$, operating over the scale or indicator-dial $17^y$ in a manner well understood.

The drum 16 over which the netting is carried after it is twisted has suitable spurs $16^e$ to pull the netting away from the twisting mechanism onto the take-up roller 21, provided at one end with a gear $21^a$, that meshes with a gear $18^a$ on a short shaft 18, which has a hand-wheel $18^c$ at the outer end and is provided with a flange-pulley $18^d$ at the inner end (see dotted lines on Fig. 2) disposed in alinement with the flange-pulley 26 on the shaft 14, and the two flanged pulleys $18^d$ and 26 are connected by a belt $x$, (see Fig. 4,) with which engages a small flanged pulley 23 in the upper end of a lever-arm 24, adjustably connected to the weight-carrying lever 25, fulcrumed on the main frame, as shown, and which serves to hold the pulley 23 pressed against the under side of the loose friction-belt for the following reason: In operation when the roll of netting is first started the weight on lever 25 is moved toward the fulcrum of the lever 25; but as the roll increases in diameter the weight is moved outwardly to press the pulley 23 with increased force against the friction-belt $x$, and thereby keep a uniform tension on the netting.

The take-up roller 21 is journaled in open bearings formed in the horizontal rearwardly-projecting extensions $2^f$ of the frame portions 2 2, and in the complete arrangement of my machine it is detachably supported in its bearings in any suitable manner to permit of lifting it out and taking off the roll of netting.

While I prefer to use the special arrangement of wire-netting on the take-up and tension mechanisms as shown and described, I desire it understood that the said mechanisms may be of any approved character, as the same forms no essential feature of my present invention.

The pitmen 7 7$^x$ through the links 7$^a$ 7$^a$ are connected, respectively, with the upper and lower shifting or rack bars 6$^x$, the reciprocal motion of which actuates the twister-gear mechanism, and as the construction and operation of both bars 6$^x$ and the manner in which they coöperate with their respective upper and lower shifter-slides E E' and E$^2$ E$^3$, in which the bobbins and the twister-gear devices are mounted and by which the said bobbins are reciprocally shifted preparatory to imparting a proper reverse rotary motion to the twister-gear, a detail description of one of the rack-bars 6$^x$ and its coöperation with the slides will be given.

Figure 7:
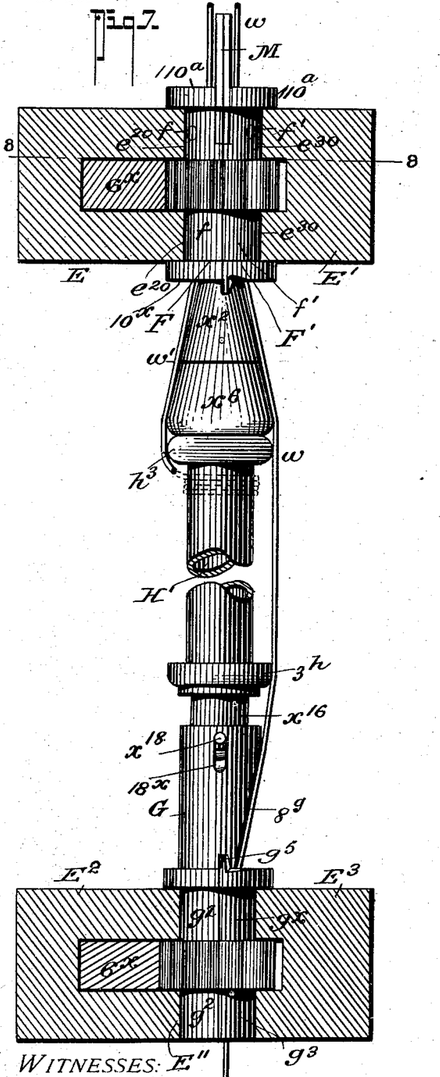
Fig. 7 is a detail vertical section of the upper and lower gear supporting and shifting bars of the rack members for imparting reverse rotary motion to the said heads, one of the bobbins, with its upper and lower gear-heads coöperatively joined therewith, being shown in side elevation.
Figure 8:
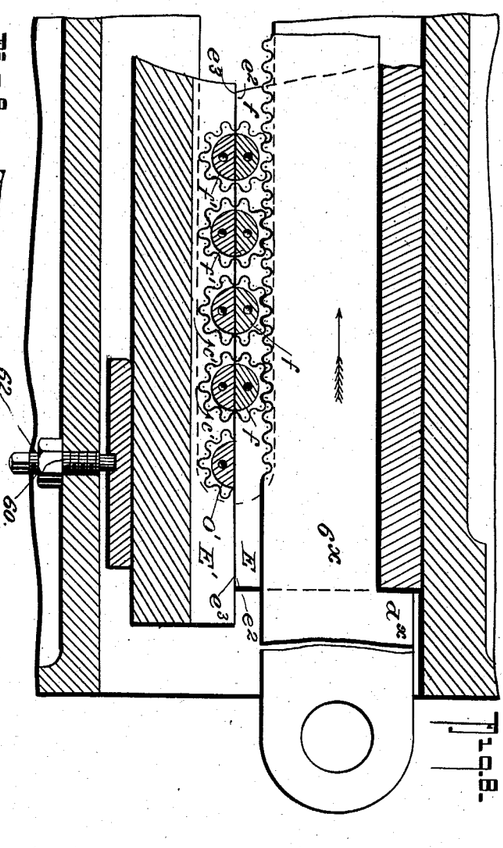
Fig. 8 is a detail horizontal section of a portion of one end of the bobbin-gear-actuating means, the shifted bars therefor, one end of the pitman-rack being shown in the position it assumes after shifting the gear-head sections mounted thereon in the direction indicated by the arrow, the said horizontal section being taken practically on the line 8 8 of Fig. 7.
Figure 9:
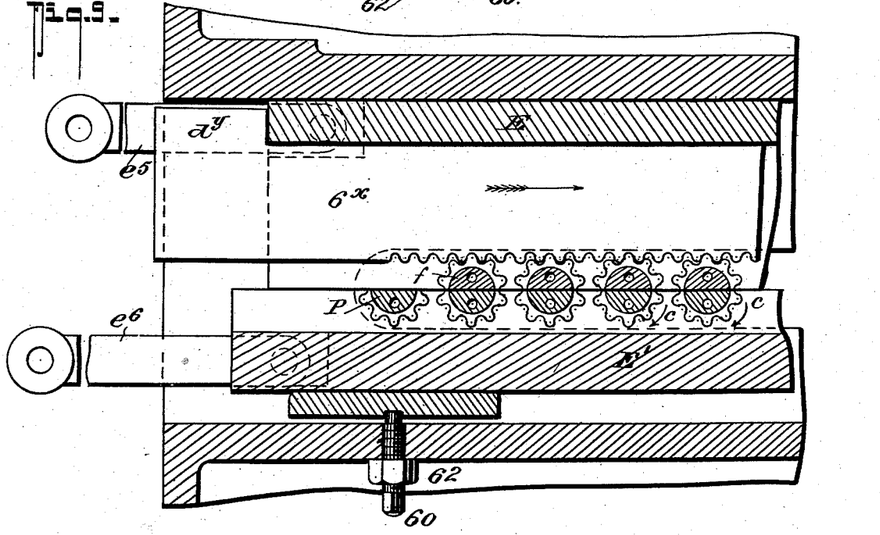
Fig. 9 is a similar view of a portion of the opposite end of the said pitman and its adjacent coöperative parts, said pitman being in the position it appears after having shifted the bobbin-gears and the bobbins carried thereby in the direction of the arrow and reversely to the position said parts appear in Fig. 8.
Figure 10:
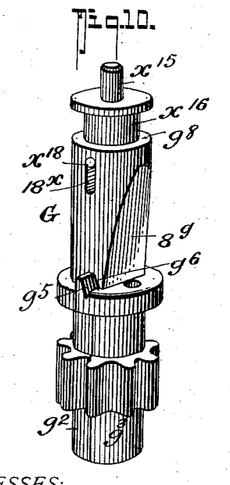
Fig. 10 is a perspective view of one of the lower bobbin-gear heads.
Figure 11:
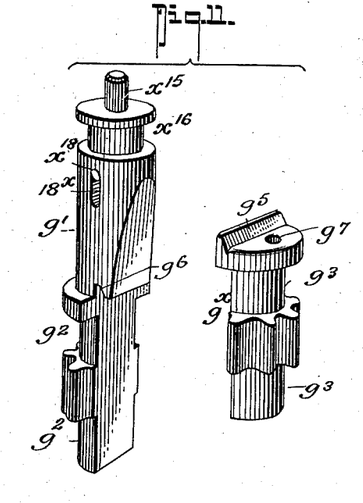
Fig. 11 is a similar view of the same, the interlocking parts thereof being separated.
Figure 12:
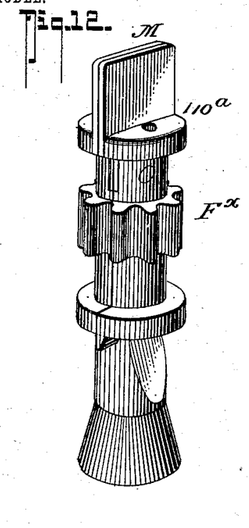
Fig. 12 is a similar view of one of the complete upper bobbin-gears.
Figure 13:
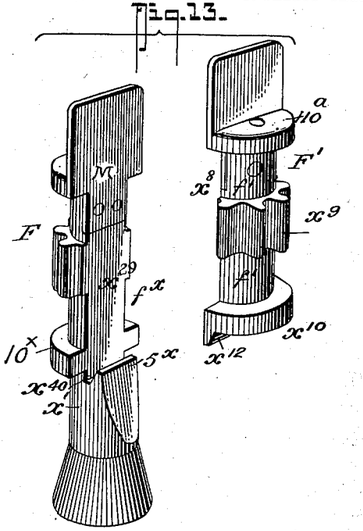
Fig. 13 is a like view thereof, the interlocking parts being separated.

By referring now more particularly to Figs. 7, 8, and 9, it will be noticed the slides E E' are disposed in the same horizontal plane with their meeting edges $e^2$ $e^3$ in close proximity, and the said edges $e^2$ $e^3$ have a series of regularly-spaced semicircular vertical grooves $e^{20}$ $e^{30}$ to receive the semicircular necks or bearing portions $f$ $f'$ of the upper divided gears or twister-head members F F', the construction of which is best shown in Figs. 11 to 13 and will presently be described in detail, it being understood that the lower divided gears or twister-heads G are also formed with necks or bearing portions $g'$ $g^x$ to engage with the correspondingly-shaped semicircular grooves or seats E'' in the meeting or lower faces of the guides E$^2$ E$^3$. The rack-bar 6$^x$, at the end of which the pitman 7 connects, has a shoulder $d^x$, adapted at predetermined times—that is, during the finish of the stroke of bar 6$^x$ in the direction indicated by the arrow on Fig. 8—to contact with the slide E and push it in the direction indicated and in so doing carry those portions of the divided head or twister-gears F and G journaled thereon with it, the extent of said shifting movement being governed by the throw of the said pitman 7 and the manner in which the same is adjustably connected to the crank-disk that actuates it.

Figure 15:
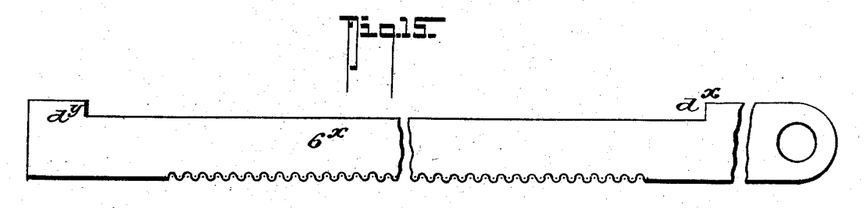
Fig. 15 is a detail view of one of the pitman-racks for reciprocating the bobbin-carrying slides and imparting reverse rotary motions to the bobbin-gears or twister devices.
Figure 16:
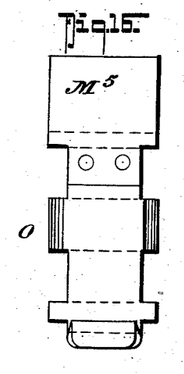
Figure 17:
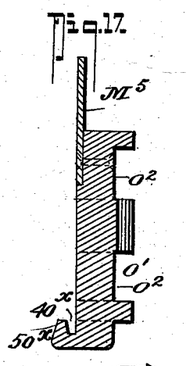
Figure 18:
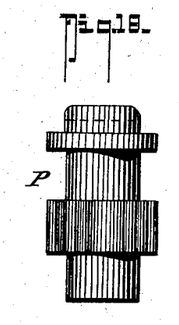
Figs. 18 and 19 are similar views of the bottom dummy twister-gears.
Figure 19:
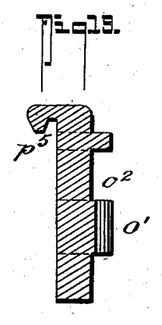

The action of the shifting slides E E' and E$^2$ E$^3$ in my present case is accomplished substantially in the same manner as is described and shown in my former patent referred to. In my present invention each rack-bar 6$^x$ 6$^x$ has a lug or shoulder $d^y$ at its outer end adapted on the finish of the stroke of the bar 6$^x$ in the direction of the arrow indicated on Fig. 9 to engage with the slide E and shift the said slide, together with the gear-head portions carried thereon, in the direction indicated. The rack-bar 6$^x$ in the position shown in Fig. 23 is at the end of its stroke in direction of arrow $x$ $x$, and the slides E$^2$ and E$^3$ are locked fast. The rack-bar now travels in the direction shown by the arrow $y$ $y$ a sufficient distance to revolve the gear-heads one or more times, as the kind of fabric to be made may require. In the present case it is three complete revolutions, when the plate-surfaces of the gear-heads F$^x$ will again be in line with the face of the slides E$^2$ and E$^3$. The shoulder $d^y$ (see Fig. 20) on the back of the rack-bar 6$^x$ then engages the end of the slide E$^2$, moving it one-half the distance between the centers of two adjacent gear-heads F$^x$. At the same time the link $e^5$, connecting the slide E$^2$ with the evener K, forces the roller $k$ out of the seat J$^2$ in the latch J, drawing the evener-bar K to the position indicated by the broken line $k^x$ on Fig. 20, and the link $e^6$ draws the slide E$^3$ in the direction indicated by the arrow one-half the distance between the centers of two adjacent gear-heads F$^x$, thereby bringing the slides E$^2$ and E$^3$ into position where the half-gears F$^x$ coincide throughout the whole series and the roller $k'$ enters the seat J$^2$ in the latch J', thereby locking the slides in their places. The rack then returns, revolving the gear-heads F$^x$ the required number of revolutions, when the shoulder $d^x$ on the other end of the rack-bar 6$^x$, Fig. 15, engages the end of the slide E$^2$, forcing it back to the first position. In my present construction of netting-machine each set of slide members E E' and E$^2$ E$^3$ is coupled in a manner to simultaneously reciprocate, but in reverse directions, whereby when the slide E$^2$ is forced in one direction the slide E$^3$ is forced in the opposite direction an equal distance, and the divided gear-sections carried on the two opposing slides will be thereby projected in opposite directions, so that the half-gear of one bobbin will coincide with the half of the adjacent bobbin throughout the full series of bobbins.

Figure 20:
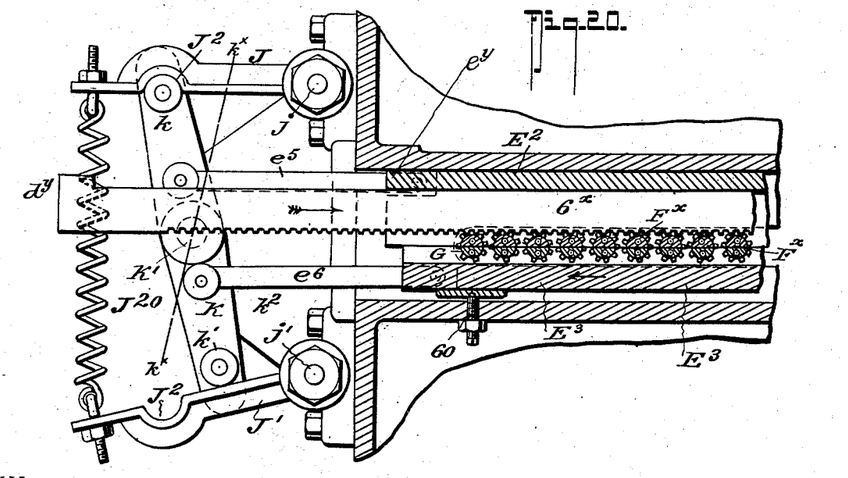
Fig. 20 is a plan view of one of the evener lock devices for holding the bobbin-shifting heads or slides from movement during the operation of twisting the strands and for moving the front slide $E^3$ to its proper position to provide suitable bearings for the gear-heads $F^x$.

The slides E$^2$ E$^3$, as also E E', are connected with an evener mechanism which involves substantially the same construction of like mechanism shown in my other patent, with certain modifications best shown in Fig. 20, by reference to which it will be apparent the lock-arms J J' are disposed in a horizontal plane and are hinged at their inner ends on the stud-bolts $j$ $j'$ and are pulled rearwardly toward each other by stout coil-springs J$^{20}$, which are adjustably connected to the outer ends of the said arms J J'. In my present invention the latch-arms J and J' have their hinge connection constructed in the manner shown in Figs. 24 and 25, by reference to which it will be noticed the inner end of arm J has a large aperture to receive an eccentric bushing 60, that engages the stud or hinge-bolt $j$, whereby to provide for making the length of the latch adjustable, and thereby admit of making a very accurate coöperative adjustment of all of the shiftable parts, since the bushing can be readily turned around on the stud $j$ to increase or decrease the length of the arm J to lock the slides E$^2$ and E$^3$ in their proper positions. The rollers $k$ $k'$ on the evener-bar K and the lock-seats in the arms J J' are so correlatively arranged that when the roller $k$ engages its lock-seat J$^2$ the roller $k'$ is riding on the flat inner face of the opposite rack-arm J', and when the parts are actuated to assume the position shown in Fig. 20 the rack-bar $6^x$ will have reached the extremity of the throw in the direction indicated by the arrow on Fig. 8, and the two slides $E^2$ $E^3$, which are joined with the evener-bar K by the links $e^5 e^6$, will be firmly locked from movement, and as at this time the shoulder $d^y$ of the bar $6^x$ is at the maximum distance from the adjacent end of the slide $E^2$ it follows that the said bar $6^x$ will move a distance equal to the space between the shoulder $d^y$ and the end $e^y$ of the slide $E^2$, when the said slide $E^2$ will be engaged and the evener and lock devices shifted from the position shown. During the interum of the shifting of the slides $E^2$ $E^3$ the movement of the rack-bars $6^x$ is utilized exclusively for rotating the twister heads or gears, it being understood that when the parts are located as shown in Fig. 20 the movement of the rack-bars $6^x$ to the right will effect a rotation of the divided gears, (the sections of which are at this time interlocked, as will hereinafter be explained,) which will then be rotated in the direction indicated by the arrow on Fig. 9 to effect the twist of the woof and warp strands until the shoulder $d^y$ engages the slide $E^2$ or E, when further rotation of the gears is checked, as the two parts of the twister-gears are then separated, shifted in alternate directions to project the half-gear of one bobbin in alinement with the half-gear of the adjacent bobbin throughout the full series of bobbins, and when this occurs the rack-bars $6^x$ will have been shifted to the direction indicated by the arrow on Fig. 9 to the full sweep, and when thus shifted the evener K changes to the position indicated by the broken line $k^x$ $k^x$ on Fig. 20 to bring the roller $k'$ in a locked engagement with the adjacent lock-seat $J^2$, and while in this position the rack-bar $6^x$ proceeds back in a reverse direction and the same then actuates the end-shifted gear-heads in the direction indicated by the arrow on Fig. 8, and thereby twists the two strands reversely until the shoulder $d^x$ again engages the slide $E^2$ or E.

In my present invention the upper heads or twister-gears, (designated generally by $F^x$,) the construction of which is clearly illustrated in Figs. 7, 12, 13, and 14, each consist of two half-gears F F', one of which, F', is integral with a long body portion $f^x$, the upper part of which is semicircular in cross-section and has its flat face $x^{29}$ extended from the pendent circular portion $x'$, the lower end of which has a threaded socket $x^2$, adapted to receive the screw-shank $x^3$, formed with a disk or head portion $x^4$ and a pendent stud $x^5$, the purpose of which will presently appear. $x^6$ designates a socket member loosely held on the lower end $x^2$ of the member $x'$ by the screw-shank $x^3$, and the said socket-piece $x^6$ of the heads F forms the bearings for the upper end $h$ of the bobbins H, as clearly shown in Fig. 14, from which it will be noticed the bobbin H consists of a tubular body H', in the upper end of which is held the member $h$, centrally apertured, as at $h'$, and provided with a hub $h^2$, whereby to snugly fit into the socket in the part $x^6$ to receive the stud $x^5$, such arrangement providing a solid bearing for the lower end of the rotatable head or gear F and also for conveniently connecting the bobbin H therewith or removing the same therefrom without interfering with the rotary motion of the said twister head or gears in the manner presently described. To prevent the wire carried on the bobbin from creeping up onto the lower end of the gear-head F, the hub $h^2$ has an annular flange which projects beyond the peripheral edge of the bobbin, as shown. The flat face $x^{29}$ of the gear-section F merges at the lower end with a transverse groove $x^{40}$, formed between the said face and a vertically-projected flange $5^x$, and the upper end of the said face merges with the flat face of an upwardly-projecting flat member, which connects with a similar flat blade or member on the opposing half-geared section F', forms an upwardly-projecting arm M, designed to project upward, so that the wires to be twisted will be carried upwardly and wound about each other over the upper edge of the said arm M to provide for making the twist suitable distances above the upper end of the gears proper. The other half-gear section F' comprises a short body portion $x^8$, the parts $f'$ $f'$ above and below the half-gear $x^9$ form the half-section mates for the like portions $f f$ on the opposite gear-section F, and the lower end of the body $x^8$ terminates in a semicircular horizontal flange $x^{10}$, that, together with a similar flange $10^x$ on the opposite member, forms a collar for engaging the under face of the slide members in which the gears are mounted, similar collar members $110^a$ being formed on the upper ends of the gear-sections F and F' at the base of the arms M for engaging the upper faces of the said gear-carrying slides. The collar-section $x^{10}$ of the short-body half-gear has a transverse pendent flange $x^{12}$, which when the two half-sections are brought into register seats in the groove $x^{40}$ of the opposing member, and thereby forms a simple and effective means for interlocking the two half-sections and holding them in a firm and perfect alinement, the said arrangement of the two-part upper gears providing for an economical, strong, and durable construction thereof. The pendent flange $x^{12}$ and the groove $x^{40}$ are more particularly employed to prevent the half-gears $F^x$ from spreading apart, whereby to permit the use of much heavier wire in making netting than has heretofore been usually employed. The body portion of each half-section is apertured vertically, as at $x^{13}$ $x^{14}$, for threading the woof and the warp wires therethrough and by making the base of each gear-head conical or tapering, as shown, and the said apertures $x^{13}$ $x^{14}$ are brought into a close alinement with the opposite faces of the two-part arms M, whereby to bring the two wire strands to bear firmly against the said opposite faces of the twister-arms M in a manner clearly shown in Fig. 7, such arrangement of parts also providing for a positive and uniform feeding of the bobbin and the warp-wires, the former being held from engagement with the woof-wire coils on the bobbins by engaging the annular flange $h^3$ on the upper bobbin-head and a similar flange $3^h$ on the lower bobbin-head $2^h$, which is also apertured, as at $3^x$, to receive the stud-pintle $x^{15}$ of the lower bearing-hub $x^{16}$. The lower twister-heads G (see Figs. 10 and 11) are also each formed of a long body $g'$, that carries one of the half-gears, the semicircular portions $g^2$ $g^2$ below the half-gears, which, together with the like portions $g^3$ $g^3$ on the short body member $g^x$, form the bearing-necks for engaging the concaved seats in the reciprocating slides that carry the lower gears G, and the opposing faces of the long and short body portions of the gears are flat to provide for a close engagement of the two members $g'$ $g^x$, which are held interlocked when brought into register by a transverse flange $g^5$ on the upper end of the part $g^x$ and the transverse groove $g^6$ at the upper end of the flat face of the portion $g'$, constructed similar to the flange and groove interlocking portions on the upper half-gears. The short gear-body $g^x$ is vertically apertured, as at $g^7$, for the passage therethrough of the warp-wire, which extends up from the wire guide-roll 4. (See Fig. 1.) The body portion $g'$ of the gear G has a vertical cylindrical extension $g^8$, beveled at one side, as at $8^g$, to provide for the proper guiding of the warp-wire up through the lower bobbin-hub flange $3^h$, and the said extension has a socket $g^{10}$ in its upper end, the base of which merges with a central socket $10^g$, adapted to receive the pendent portion of the spindle $x^{15}$ of the hub $x^{16}$ and to form a guide for a buffer-spring $x^{17}$, mounted in the socket $g^{10}$ (see Fig. 14) and which serves to normally force the hub $x^{16}$ in an upward direction under a strong spring tension, and the said hub $x^{16}$ is held from leaving the socket $g^{10}$ by the cross-pin $x^{18}$, the ends of which extend through the slots $18^x$ in the hub $x^{16}$. (See Fig. 10.)

Figure 14:
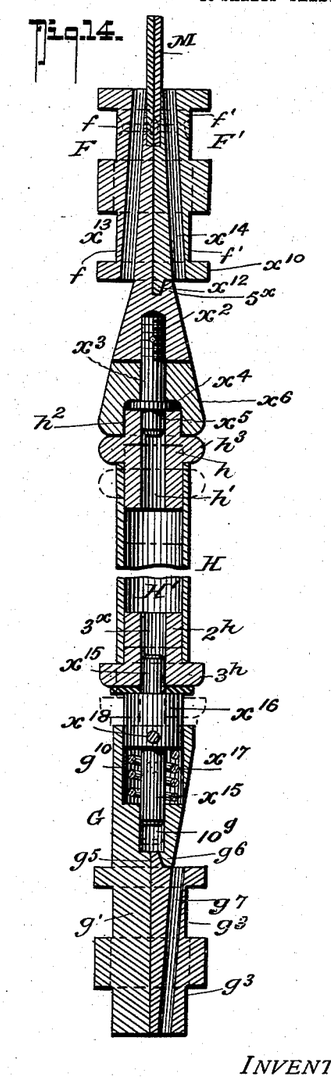
Fig. 14 is a vertical section of one set of the upper and lower bobbin-gears and the upper and lower ends of a bobbin and illustrating the manner in which the bobbin is removably connected with the said gears.

By reason of the construction of the opposite ends of the bobbins and the coöperative arrangement of the upper and lower bearings it will be apparent that any one of the bobbins can be quickly removed when empty by pressing the same downwardly sufficiently to cause the upper end to lower to the position shown in dotted lines in Fig. 14, so that the head portion $h^2$ will spring clear of the member $x^6$ on the upper gear, and a filled bobbin can be quickly substituted by fitting the lower end $3^x$ on the yielding hub member $x^{16}$ and pressing down on the same (see dotted lines at the lower end of Fig. 14) sufficiently to permit swinging the upper end of the bobbin along and into the socket of the part $x^6$. After placing a filled bobbin in position the upper end of the wire coiled thereon is threaded through the guide-aperture in the gear member F and then tied to the proper portion of the partly-woven netting.

At each end of the bobbin carrying or shifting bars E E' E$^2$ E$^3$ is mounted what I term an "upper dummy twister" O, which consists of a semicircular portion $o'$, integral with semicircular journals $o^2$ $o^2$ to fit the endmost ones of the grooves or pockets in the meeting faces of the slides E E', and the said gear portion $o'$ has a transverse groove $40^x$ and a flange $50^x$ to engage with the tongue or flange $x^{12}$ of the adjacent gear portions F' when the same are shifted into alinement therewith. The upper dummy gears $o$ have upwardly-extended plates or arms M$^5$, that coact with the like arm portions M on the half-gear members F'.

P designates what I term the "lower dummy-gear" members, that coact with the gear portions $o'$ and are mounted in the lower shifter-bars, and the said members P are constructed similar to the members O, except they have no spreader-arms M$^5$, and the transverse interlocking groove $p^5$ is at the upper end to coact with the flange $g^5$ of the adjacent bottom twister-gear $g^8$. The dummy gears take the place of the long halves of the gear-heads at the points where the selvages run up. In practice the selvages and the warp or back wires are fed from spools and pass under the guide-roller 4, and all pass through the apertures in the short half-turn gear-heads. The selvages can be passed through any of the gear-heads, thereby making products of any required width or making several widths at the same time by simply leaving out a bobbin between each separate web or width of netting.

From the foregoing, taken in connection with the accompanying drawings, it is believed the complete construction and the general operation of my invention will be readily understood by those skilled in the art to which it appertains.

Among the advantages found in my present construction is the practical detail arrangement of the two half-gear sections that form the twister-heads, especially the ribs for readily and positively interlocking the divided gear-sections as they shift in alternate engagement with each other, the ease in which one or more of the bobbins can be readily removed or replaced without stopping the machine. Again, the construction of the slides and the manner in which the same are coöperatively joined with each other and with the twister mechanism presents a simple and positively-actuating means for the purposes desired.

Another and important advantage resultant in the use of my present invention is that in the operation of removing the empty bobbin and the substitution of a filled one I am enabled to avoid the use of collars, latches, ferrules, or similar devices heretofore employed, and which generally require the use of both hands to change them. Furthermore, by reason of the dispensing of the said forms of bobbin locking or holding means I avoid the projections usually found in the common form of bobbin-connections that tend to entangle the warp-wires and thereby cause much trouble and delay. In my case there is nothing projecting beyond the bobbin-line other than the collars $h^3$, which serve to hold the warp-wires clear of the woof-wires on the bobbins at all times.

Having thus described my invention, what I claim, and desire to secure by Letters Patent, is—

1. In a wire-netting machine; upper and lower opposing slides, a plurality of bobbins each provided with a divided gear upon each end, one section of each gear being mounted in one of the slides, the other section of the said gears being mounted in the opposing slides, said section-gear members having interlocking flange portions adapted to interlock with each other when brought into alinement by the shifting of the slides in reverse directions, as set forth.

2. The combination in a wire-netting machine; an upper and a lower set of slides, a rack-bar for each set of slides, bobbins carried by the said upper and lower slides and including upper and lower divided gears adapted to engage with the upper and lower rack-bars, means for reciprocating the rack-bars, said rack-bars each having a lug at each end for engaging the slides at the end of the stroke of the bars in their opposite directions, for the purposes specified, and means for reciprocating the rack-bars in unison.

3. The combination with a series of bobbins, a half-gear section secured on each end of the bobbins, a reciprocable slide for each half-bobbin-carrying gear-section, a second slide opposing the other slide, connections joining the two slides for imparting reverse reciprocal motion to one slide as the other is actuated, half-gear sections rotatably mounted on the said other slide adapted to be brought into register with the opposing half-gear sections, said gear-sections having upwardly-projecting wire-spreader arms and vertical apertures adjacent the faces of the said arms for the passage of the two wire strands therethrough, as set forth.

4. The combination with the main frame, of a drive-shaft, an upper and a lower crank-gear mounted on the said shaft, a series of bobbins each having a half-gear at each end, a reciprocably-mounted slide in which the said half-gears are journaled, an opposing slide, a series of half-gears mounted thereon to oppose and be brought into register with the alternate opposite half-gears on the other slide, a rack-bar for each set of slides, means for imparting reciprocal movement to the rack-bars, stops on said bars for engaging the slides and shifting them, said bar-actuating means including pitmen journaled at one end to the bars, and a wrist-pin connection joining the other ends of the pitmen with the crank-gears on the drive-shaft, as set forth.

5. In a wire-netting machine as described, the combination with oppositely-actuating reciprocal upper and lower slides, half-gears mounted on said slides, a rack-bar for each slide for engaging said gears, the latter having flange members adapted to interlock with each other when the two sections are projected into alinement with each other, lowermost half-gears having yielding seats, the upper gears having sockets, and a series of bobbins having hubs at their lower end for engaging the aforesaid yielding seats, and pintles at the upper ends to engage the sockets, for the purposes described.

6. The combination with a suitable frame, of a series of bobbins provided with divided gears at their upper and lower ends, an upper and a lower set of slides having bearings for the divided gears, a rack-bar reciprocable between each set of slides meshing with and adapted to actuate the divided bobbin-gears, means for reciprocating said rack-bars, said rack-bars having a projection at each end adapted to engage with one of the slides of each set and shift the same at predetermined times, and link connections joining the rack-bar-actuated slides with their opposing slide members for imparting reverse reciprocal motion thereto, as set forth.

7. In a machine as described; the combination with the upper and lower sets of slide-bars each comprising a pair of opposing reciprocal members having half-journal bearings; of the bobbins, each including an upper and a lower divided gear mounted in the half-bearings of their respective upper and lower sets of slides, one of said divided gears having a yielding hub adapted to detachably receive and form bearings for one end of the gear-receiving portion of the bobbin, the opposing divided gear having a socket to detachably receive and form the bearing for the opposite end of the wire-receiving portion of the bobbin and the said half-gear sections each having interlocking flanges adapted to interlock with each other at predetermined times, as set forth.

8. In a wire-netting machine as described; the combination with the reciprocating slides having bearings to receive the bobbin half-gears; of the upper and lower divided twister-gears, the upper gear having a socket in its under face, the lower gear having a socket in its upper face, a buffer-spring mounted in said socket, a hub having a bearing-spindle mounted on the spring, and a bobbin having an aperture at the lower end to engage the spindle of the spring-held hub and a hub at the upper end to engage the socket of the upper gear, said half-gears each having interlocking flanges adapted to interlock with each other at predetermined times, as specified.

9. In a wire-netting machine as described; the combination with the upper and the lower reversely-reciprocable slides and the upper and lower twister gears or slides thereon, the upper gear and a slide including a base member having a socket and a short bearing-pintle in its lower face, the lower gear including a socket and the supplemental socket, a spring mounted therein, a hub mounted on the spring and having a vertically-extended spindle adapted to project into said supplemental socket and a tubular body portion having an apertured hub at the upper end to engage the spindle and socket in the upper gear, and a like hub at the lower end for engaging the spring-held hub and spindle of the lower gear, as specified.

10. In a wire-netting machine as described, the combination with the bobbin-body; the divided gears for the upper and lower ends of said bobbin, each comprising a member having a half-gear, half-journal portions above and below the gear, a transverse groove on its flat face, and a second member having a half-gear and half-journals for opposing the like parts of the other member, and a transverse flange on its flat face adapted to seat in and interlock with the groove in the opposing member when the two members are in register, and the reciprocable sets of upper and lower slides having half-bearings to receive their respective upper and lower half-gears, as set forth.

11. In a wire-netting machine as described; in combination with a set of slides, each having half-journal bearings in their meeting faces, divided gear-heads each having interlocking flanges mounted on said bearings, a rack-bar for rotating gears and for shifting the slides at predetermined times, a crank-actuated means for reciprocating said rack-bar, including a cross-head, and an eccentric bushing mounted thereon with which the rack-bar connects, as set forth.

12. In a wire-netting machine of the character described, in combination with the reciprocably-divided gear-carrying slides, and means for actuating said slides, of a latch mechanism for holding the slides temporarily locked at their shifted positions, said latch mechanism including latch-arms and an eccentric-bushing bearing forming a hinged connection for said arms for the purposes described.

13. In a wire-netting machine of the character described, the combination with the frame portions $5^a$ $5^a$, the slides $E^2$ $E^3$ and the rack-bar having lugs $d^x$ $d^y$, the half-gears mounted on the slides, and the driving-crank; of the cross-head 70 having studs $70^a$ $70^b$, the eccentric bushing 50 mounted on the stud $70^a$, the connecting-rod 7 joined to the bushing 50, the stud $70^b$ and end of rack $6^x$ being connected, the link $7^a$, and means for clamping said link upon the studs and bushing members, as set forth.

HIRAM S. COMBS.

Witnesses:
B. L. HILLIARD,
W. F. MASON.